United States Patent
Ito

(10) Patent No.: US 11,677,096 B2
(45) Date of Patent: Jun. 13, 2023

(54) SOLID ELECTROLYTE, ALL SOLID BATTERY, AND MANUFACTURING METHOD OF ALL SOLID BATTERY

(71) Applicant: TAIYO YUDEN CO., LTD., Tokyo (JP)

(72) Inventor: Daigo Ito, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 163 days.

(21) Appl. No.: 17/224,742

(22) Filed: Apr. 7, 2021

(65) Prior Publication Data

US 2021/0376376 A1    Dec. 2, 2021

(30) Foreign Application Priority Data

May 29, 2020   (JP) .............. JP2020-094397

(51) Int. Cl.
*H01M 10/0562* (2010.01)
*H01M 10/0585* (2010.01)

(52) U.S. Cl.
CPC ... *H01M 10/0562* (2013.01); *H01M 10/0585* (2013.01); *H01M 2300/0074* (2013.01); *H01M 2300/0091* (2013.01)

(58) Field of Classification Search
CPC ......... H01M 10/0562; H01M 10/0585; H01M 2300/0074; H01M 2300/0091; H01M 2300/0071; H01M 10/058; H01M 2300/0068; Y02E 60/10; Y02P 70/50
See application file for complete search history.

(56) References Cited

FOREIGN PATENT DOCUMENTS

| JP | 2000-26135 A | 1/2000 |
| JP | 2019-46559 A | 3/2019 |

OTHER PUBLICATIONS

Jaegyeom Kim et al., "$LiTa_2PO_8$: a fast lithium-ion conductor with new framework structure", Sep. 20, 2018, pp. 22478-22482.

*Primary Examiner* — Helen Oi K Conley
(74) *Attorney, Agent, or Firm* — Stein IP, LLC

(57) ABSTRACT

Solid electrolyte includes a first solid electrolyte that is a phosphate salt including Li and Ta, and a second solid electrolyte that is NASICON type solid electrolyte. In a cross section of the solid electrolyte, an area ratio of the first solid electrolyte is more than 10% and an area ratio of the second solid electrolyte is more than 10%.

8 Claims, 6 Drawing Sheets

SOLID ELECTROLYTE, ALL SOLID BATTERY, AND MANUFACTURING METHOD OF ALL SOLID BATTERY

CROSS-REFERENCE TO RELATED APPLICATION

This application is based upon and claims the benefit of priority of the prior Japanese Patent Application No. 2020-094397, filed on May 29, 2020, the entire contents of which are incorporated herein by reference.

FIELD

A certain aspect of the present invention relates to solid electrolyte, an all solid battery, and a manufacturing method of the all solid battery.

BACKGROUND

Recently, secondary batteries are being used in various fields. Secondary batteries having electrolytic liquid have a problem such as leak of the electrolytic liquid. And so, all solid batteries having a solid electrolyte and other solid elements are being developed.

Known solid electrolyte is such as a sulfide-based solid electrolyte having high ionic conductivity at a room temperature, an oxide-based solid electrolyte which is stable in normal atmosphere, a polymer-based solid electrolyte, a hydride-based solid electrolyte or the like. The oxide-based solid electrolyte is superior to other compound-based solid electrolyte in a point of high stability and high safety in normal atmosphere. On the other hand, the oxide-based solid electrolyte is hard in mechanical personality. In order to achieve ionic conductivity, grains of the oxide-based solid electrolyte are sintered during firing at a high temperature and an interface resistance is reduced.

A NASICON type such as Li—Al—Ti—P—O-based solid electrolyte or Li—Al—Ge—P—O-based solid electrolyte is known as the oxide-based solid electrolyte having high ionic conductivity (for example, see Japanese Patent Application Publication No. 2000-26135 and Japanese Patent Application Publication No. 2019-46559). And, it is reported that $LiTa_2PO_8$ has higher ionic conductivity (for example, see J. Mater. Chem. A, 2018, 6, 22478-22482).

SUMMARY OF THE INVENTION $LiTa_2PO_8$ has high ionic conductivity such as $2.5 \times 10^{-4}$ S/cm at a room temperature. It is requested that LiTa2PO8 has a high sintering temperature (for example, 1050 degrees C.). Therefore, when an all solid battery is formed, $LiTa_2PO_8$ may react a mutual diffusion reaction with almost all electrode active material during a firing process. Therefore, it is difficult to use $LiTa_2PO_8$. A NASICON type solid electrolyte can be fired at a low temperature. However, ionic conductivity of the NASICON type solid electrolyte may be lower than that of $LiTa_2PO_8$.

According to an aspect of the present invention, there is provided solid electrolyte including: a first solid electrolyte that is a phosphate salt including Li and Ta; and a second solid electrolyte that is NASICON type solid electrolyte, wherein, in a cross section of the solid electrolyte, an area ratio of the first solid electrolyte is more than 10% and an area ratio of the second solid electrolyte is more than 10%.

According to another aspect of the present invention, there is provided an all solid battery including: a solid electrolyte layer including the solid electrolyte; and a plurality of internal electrodes that include an electrode active material, wherein the solid electrolyte layer and each of the plurality of internal electrodes are alternately stacked.

According to another aspect of the present invention, there is provided a manufacturing method of an all solid battery including: preparing a multilayer structure including a green sheet including phosphate salt powder including Li and Ta and amorphous solid electrolyte powder of NASICON type, a first electrode layer paste formed on a first main face of the green sheet, and a second electrode layer paste formed on a second main face of the green sheet; and firing the multilayer structure.

DETAILED DESCRIPTION

A description will be given of an embodiment with reference to the accompanying drawings.

Figure 1A:
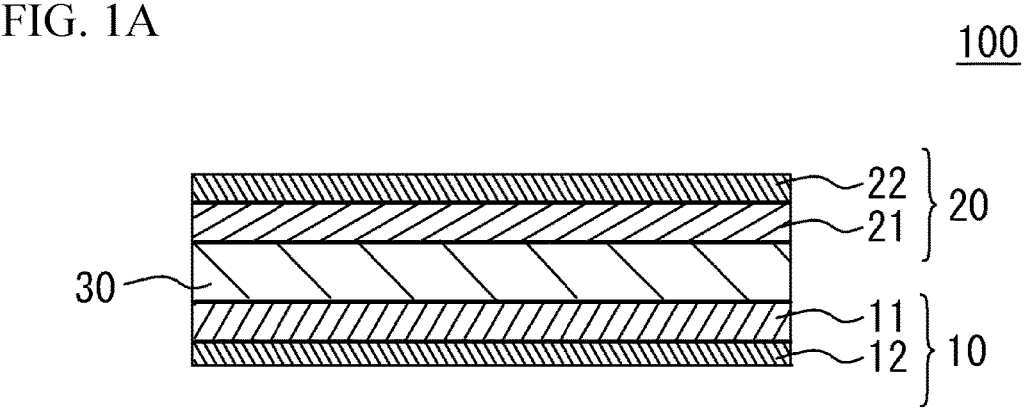
FIG. 1A illustrates a schematic cross section of a basic structure of an all solid battery.

(Embodiment) FIG. 1A illustrates a schematic cross section of a basic structure of an all solid battery 100 in accordance with an embodiment. As illustrated in FIG. 1A, the all solid battery 100 has a structure in which a first electrode 10 and a second electrode 20 sandwich a solid electrolyte layer 30. The first electrode 10 is provided on a first main face of the solid electrolyte layer 30. The first electrode 10 has a structure in which a first electrode layer 11 and a first electric collector layer 12 are stacked. The first electrode layer 11 is on the solid electrolyte layer 30 side. The second electrode 20 is provided on a second main face of the solid electrolyte layer 30. The second electrode 20 has a structure in which a second electrode layer 21 and a second electric collector layer 22 are stacked. The second electrode layer 21 is on the solid electrolyte layer 30 side.

When the all solid battery 100 is used as a secondary battery, one of the first electrode 10 and the second electrode 20 is used as a positive electrode and the other is used as a negative electrode. In the embodiment, as an example, the first electrode 10 is used as a positive electrode, and the second electrode 20 is used as a negative electrode.

Figure 1B:
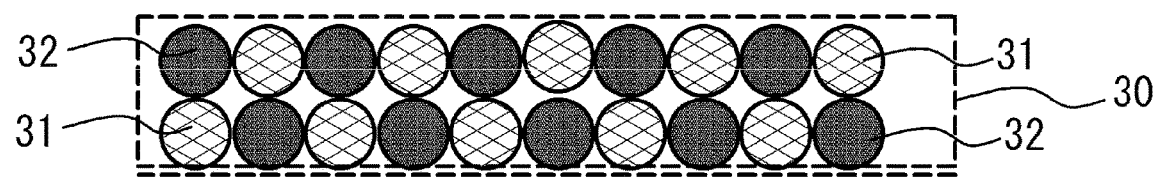
FIG. 1B illustrates a schematic cross section of a solid electrolyte layer.

A main component of the solid electrolyte layer 30 is solid electrolyte having ionic conductivity. The solid electrolyte of the solid electrolyte layer 30 includes phosphate salt including Li and Ta and NASICON type solid electrolyte. The phosphate salt including Li and Ta is, for example, $LiTa_2PO_8$. FIG. 1B schematically illustrates a cross section of the solid electrolyte layer 30. As illustrated in FIG. 1B, the solid electrolyte layer 30 includes $LiTa_2PO_8$ grains 31 and solid electrolyte grains 32 having a NASICON structure. The solid electrolyte layer 30 has a structure in which the $LaTa_2PO_8$ grains 31 and the solid electrolyte grains 32 are randomly located.

The phosphate salt including Li ant Ta has high ionic conductivity and is stable in normal atmosphere. $LiTa_2PO_8$ may have a composition range such as $Li_{1+2x+y}A_xB_yC_zTa_{2-x-y-z}PO_8$. "A" is at least one of trivalent metal elements Al, Sc, Y and La. "B" is at least one of tetravalent metal elements Ge, Hf, Sn and Zr. "C" is at least one of pentavalent metal elements Nb, As, Sb and Bi. The relationship "$0 \le x+y+z \le 0.5$" is satisfied.

The NASICON type solid electrolyte has relatively high ionic conductivity and is stable in normal atmosphere. And, the NASICON type solid electrolyte can be fired at a relatively low temperature. The NASICON type solid electrolyte is, for example, phosphoric acid salt-based electrolyte having a NASICON structure. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$ which is Li—Al—Ge—$PO_4$ based electrolyte, $Li_{1+x}Al_xZr_{2-x}(PO_4)_3$ which is Li—Al—Zr—PO4 based electrolyte, $Li_{1+x}Al_xTi_{2-x}(PO_4)_3$ which is Li—Al—Ti—PO4 based electrolyte, or the like. For example, it is preferable that Li—Al—Ge-PO4-based material, to which a transition metal included in the phosphoric acid salt having the olivine type crystal structure included in the first electrode layer 11 and the second electrode layer 21 is added in advance, is used. For example, when the first electrode layer 11 and the second electrode layer 21 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte. When the first electrode layer 11 and the second electrode layer 21 include phosphoric acid salt including Li and a transition metal other than Co, it is preferable that the solid electrolyte layer 30 includes Li—Al—Ge—$PO_4$-based material in which the transition metal is added in advance.

At least, the first electrode layer 11 used as a positive electrode includes a material having an olivine type crystal structure, as an electrode active material. It is preferable that the second electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first electrode layer 11 acting as a positive electrode. For example, when only the first electrode layer 11 includes the electrode active material having the olivine type crystal structure, the electrode active material acts as the positive electrode active material. When the second electrode layer 21 also includes an electrode active material having the olivine type crystal structure, discharge capacity may increase and an operation voltage may increase because of electric discharge, in the second electrode layer 21 acting as a negative electrode. The function mechanism is not completely clear. However, the mechanism may be caused by partial solid-phase formation together with the negative electrode active material.

When both the first electrode layer 11 and the second electrode layer 21 include an electrode active material having the olivine type crystal structure, the electrode active material of each of the first electrode layer 11 and the second electrode layer 21 may have a common transition metal. Alternatively, the a transition metal of the electrode active material of the first electrode layer 11 may be different from that of the second electrode layer 21. The first electrode layer 11 and the second electrode layer 21 may have only single type of transition metal. The first electrode layer 11 and the second electrode layer 21 may have two or more types of transition metal. It is preferable that the first electrode layer 11 and the second electrode layer 21 have a common transition metal. It is more preferable that the electrode active materials of the both electrode layers have the same chemical composition. When the first electrode layer 11 and the second electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first electrode layer 11 and the second electrode layer 21, moreover, oxide-based solid electrolyte material or a conductive material (conductive auxiliary agent) such as a carbon material or a metal material may be added. When the material is evenly dispersed into water or organic solution together with binder or plasticizer, paste for electrode layer is obtained. Pd, Ni, Cu, or Fe, or an alloy thereof may be used as a metal of the conductive auxiliary agent.

A main component of the first electric collector layer 12 and the second electric collector layer 22 is conductive material. For example, the conductive material of the first electric collector layer 12 and the second electric collector layer 22 may be a metal material or a carbon material.

As mentioned above, in the embodiment, the solid electrolyte layer 30 includes $LiTa_2PO_8$. $LiTa_2PO_8$ has high ionic conductivity. Therefore, $LiTa_2PO_8$ achieves favorable cell characteristic. The solid electrolyte layer 30 has the NASI- CON type solid electrolyte which can be fired at a relatively low temperature. It is therefore possible to fire the solid electrolyte layer 30 at a relatively low temperature. And, the mutual diffusion reaction between the solid electrolyte layer 30 and the electrode active material is suppressed.

When the ratio of $LiTa_2PO_8$ in the solid electrolyte layer 30 is high, sintering of the solid electrolyte layer 30 may be difficult at a sufficiently low temperature. And so, the ratio of $LiTa_2PO_8$ in the cross section of the solid electrolyte layer 30 has an upper limit. In the embodiment, the area ratio of $LiTa_2PO_8$ was less than 90% in the cross section of the solid electrolyte layer 30. The area ratio of the NASICON type solid electrolyte is more than 10%.

On the other hand, when the ratio of the NASICON type solid electrolyte in the solid electrolyte layer 30 is high, the ionic conductivity of the solid electrolyte layer 30 may not be necessarily high. And so, the ratio of the NASICON type solid electrolyte in the solid electrolyte layer 30 has an upper limit. In the embodiment, the area ratio of the NASICON type solid electrolyte layer is less than 90% in the cross section of the solid electrolyte layer 30. The area ratio of $LiTa_2PO_8$ is more than 10% in the cross section of the solid electrolyte layer 30.

It is preferable that the area ratio of $LTa_2PO_8$ and the NASICON type solid electrolyte is 80:20 to 20:80. It is more preferable that the area ratio is 70:30 to 30:70. It is still more preferable that the area ratio is 60:40 to 40:60.

It is possible to measure the area ratio of $LiTa_2PO_8$ and the NASICON type solid electrolyte in the cross section of the solid electrolyte layer 30 by observing the cross section with a SEM and performing an EDS element mapping analysis. It is possible to determine an area in which Ta is detected by the EDS element mapping as $LiTa_2PO_8$ and determine an area in which Ta is not detected by the EDS element mapping as the NASICON type solid electrolyte.

When the NASICON type solid electrolyte includes Ti, Tis may be reduced during charging. In this case, when the electron conductivity is enhanced, a short path may be formed. And so, it is preferable that the NASICON type solid electrolyte does not include Ti. For example, it is preferable that the NASICON type solid electrolyte is Li—Al—Ge—$PO_4$-based solid electrolyte including at least Li, Ge and P, Li—Al—Zr—$PO_4$-based solid electrolyte including at least Li, Zr and P, Li—Zr—$PO_4$ based solid electrolyte or the like.

When the Li—Al—Ge—$PO_4$-based solid electrolyte is used as the NASICON type solid electrolyte and the amount of the Li—Al—Ge—$PO_4$-based solid electrolyte is large, the order of the ionic conductivity may be reduced to $10^{-5}$ S/cm order. And, cost may increase because the usage amount of Ge is large. When the amount of the Li—Al—Ge—$PO_4$-based solid electrolyte is small, sintering at a low temperature may be difficult. And so, it is preferable that the area ratio of $LiTa_2PO_8$ and the Li—Al—Ge—$PO_4$-based solid electrolyte in the cross section of the solid electrolyte layer 30 is 80:20 to 20:80. It is more preferable that the area ratio is 70:30 to 30:70. It is still more preferable that the area ratio is 60:40 to 40:60.

When the Li—Al—Zr—$PO_4$-based solid electrolyte or the Li—Zr—$PO_4$-based solid electrolyte is used as the NASICON type solid electrolyte, the cost can be reduced compared to a case where the Li—Al—Ge-PO4-based solid electrolyte is used. On the other hand, the ionic conductivity may be reduced. And so, it is preferable that the area ratio of $LiTa_2PO_8$, and the Li—Al—Zr-PO4-based solid electrolyte or the Li—Zr—$PO_4$-based solid electrolyte is 80:20 to 30:70 in the cross section of the solid electrolyte layer 30 when the Li—Al—Zr—$PO_4$-based solid electrolyte or the Li—Zr—$PO_4$-based solid electrolyte is used as the NASICON type solid electrolyte. It is more preferable that the area ratio is 70:30 to 40:60. It is still more preferable that the area ratio is 60:40 to 50:50.

When an average crystal grain diameter of the $LiTa_2PO_8$ grains 31 in the solid electrolyte layer 30 is large, it may be difficult to reduce the thickness of the solid electrolyte layer 30 and smooth the solid electrolyte layer 30. And so, it is preferable that the average crystal grain diameter of the $LiTa_2PO_8$ grains 31 in the solid electrolyte layer 30 has an upper limit. On the other hand, when the average crystal grain diameter of the $LiTa_2PO_8$ grains 31 in the solid electrolyte layer 30 is small, the mutual diffusion reaction may easily occur between the solid electrolyte and the electrode active material during the firing process. And so, it is preferable that the average crystal grain diameter of the $LiTa_2PO_8$ grains 31 in the solid electrolyte layer 30 has a lower limit. In concrete, it is preferable that the average crystal grain diameter of the LiTa2PO8 grains 31 in the solid electrolyte layer 30 is 0.1 µm or more and 10 µm or less. It is more preferable that the average crystal grain diameter is 0.2 µm or more and 5 µm or less. It is still more preferable that the average crystal grain diameter is 0.5 µm or more and 3 µm or less. It is possible to measure the average crystal grain diameter by measuring horizontal or vertical Ferret Diameters of 50 numbers of the LiTa2PO8 grains detected by the EDS mapping of the cross section of the solid electrolyte layer 30 and calculating an average value of the measured diameters. It is preferable that the average crystal grain diameter of the solid electrolyte grains 32 of the NASICON type in the solid electrolyte layer 30 is 0.1 µm or more and 10 µm or less. It is more preferable that the average crystal grain diameter is 0.2 µm or more and 5 µm or less. It is still more preferable that the average crystal grain diameter is 0.5 µm or more and 3 µm or less.

The thickness of the solid electrolyte layer 30 is, for example, 1 µm or more and 100 µm or less, 5 µm or more and 50 µm or less, or 10 µm or more and 30 µm or less.

Figure 2:
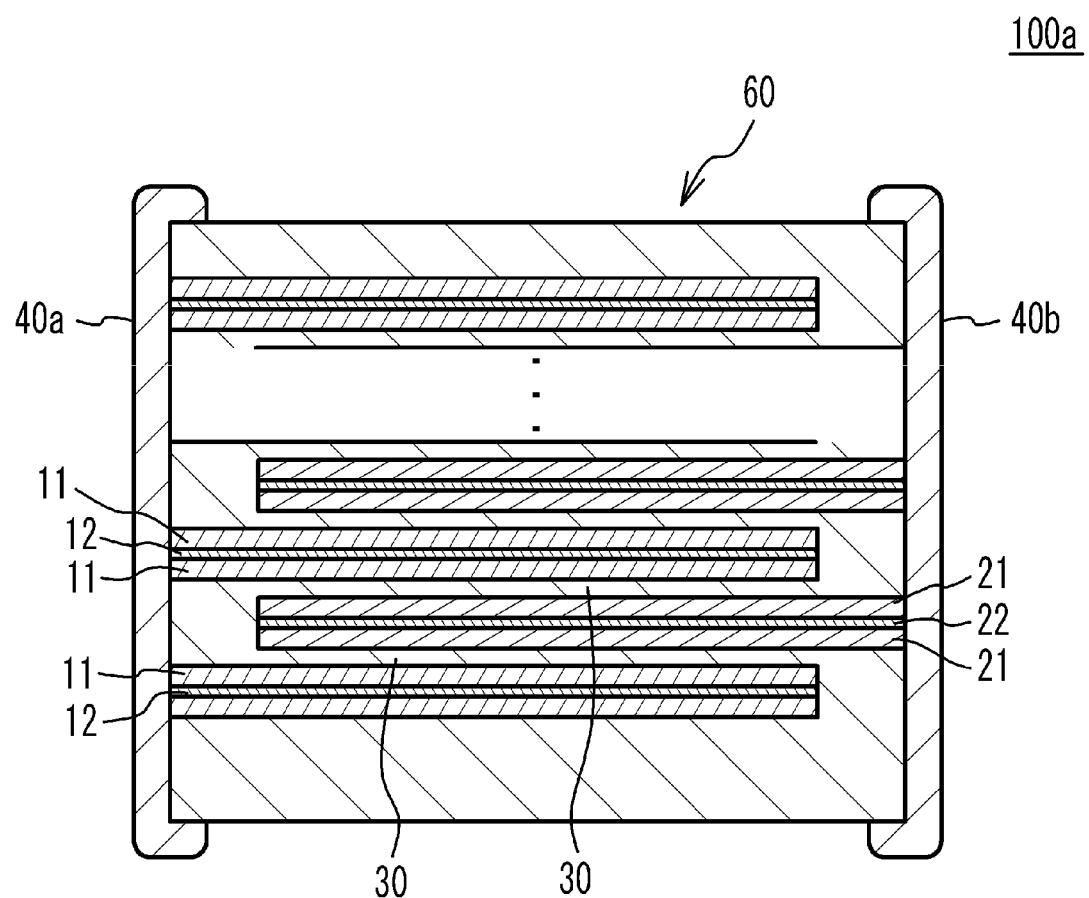
FIG. 2 illustrates a schematic cross section of an all solid battery.

FIG. 2 illustrates a schematic cross section of an all solid battery 100a in which a plurality of cell units are stacked. The all solid battery 100a has a multilayer chip 60 having a rectangular parallelepiped shape. Each of a first external electrode 40a and a second external electrode 40b is provided directly on each of two side faces among four side faces which are other than an upper face and a lower face of the multilayer chip 60 in the stacking direction. The two side faces may be adjacent to each other. Alternatively, the two side faces may be face with each other. In the embodiment, the first external electrode 40a is provided on one of the two facing side faces (end faces), and the second external electrode 40b is provided on the other of the two facing side faces.

In the following description, the same numeral is added to each member that has the same composition range, the same thickness range and the same particle distribution range as that of the all solid battery 100. And, a detail explanation of the same member is omitted.

In the all solid battery 100a, each of the first electric collector layers 12 and each of the second electric collector layers 22 are alternately stacked. Edges of the first electric collector layers 12 are exposed to the first edge face of the multilayer chip 60 but are not exposed to the second edge face of the multilayer chip 60. Edges of the second electric collector layers 22 are exposed to the second edge face of the multilayer chip 60 but are not exposed to the first edge face. Thus, each of the first electric collector layers 12 and each of the second electric collector layers 22 are alternately conducted to the first external electrode 40a and the second external electrode 40b.

The first electrode layer 11 is stacked on the first electric collector layer 12. The solid electrolyte layer 30 is stacked on the first electrode layer 11. The solid electrolyte layer 30 extends from the first external electrode 40a to the second external electrode 40b. The second electrode layer 21 is stacked on the solid electrolyte layer 30. The second electric collector layer 22 is stacked on the second electrode layer 21. Another second electrode layer 21 is stacked on the second electric collector layer 22. Another solid electrolyte layer 30 is stacked on the second electrode layer 21. The solid electrolyte layer 30 extends from the first external electrode 40a to the second external electrode 40b. The first electrode layer 11 is stacked on the solid electrolyte layer 30. In the all solid battery 100a, the stack units are repeatedly stacked. Therefore, the all solid battery 100a has a structure in which a plurality of cell units are stacked.

The multilayer chip 60 has a structure in which each of internal electrodes and each of solid electrolyte layers are alternately stacked, when the first electric collector layer 12 and two first electrode layers 11 sandwiching the first electric collector layer 12 are treated as one electrode, and the second electric collector layer 22 and two second electrode layers 21 sandwiching the second electric collector layer 22 are treated as one electrode.

Figure 3:
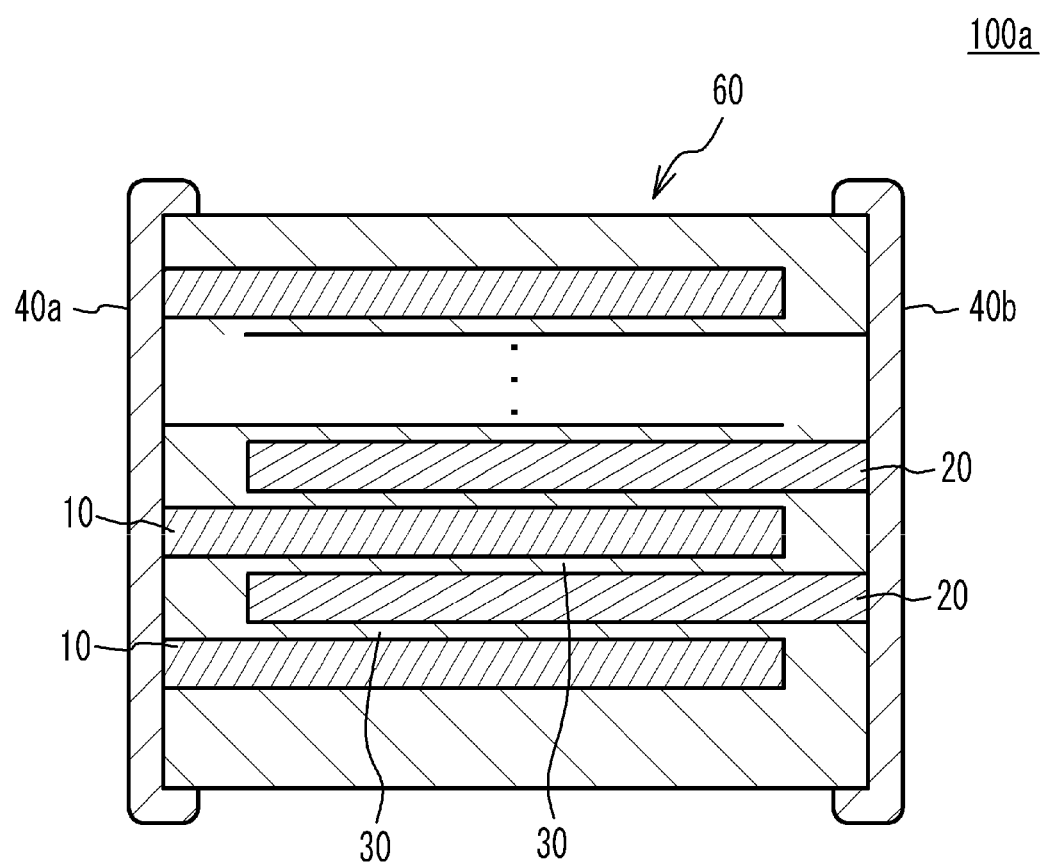
FIG. 3 illustrates a schematic cross section of another all solid battery.

The all solid battery 100a may not necessarily have the electric collector layers. For example, as illustrated in FIG. 3, the first electric collector layers 12 and the second electric collector layers 22 may not necessarily be provided. In this case, the first electrode 10 has only the first electrode layer 11. And, the second electrode 20 has only the second electrode layer 21.

Figure 4:
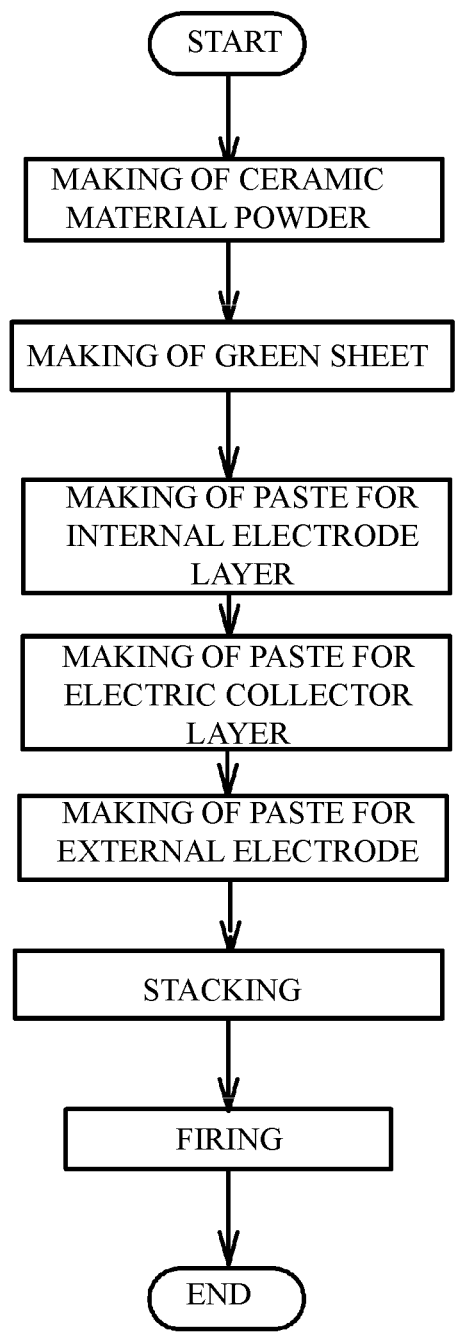
FIG. 4 illustrates a flowchart of a manufacturing method of an all solid battery.

A description will be given of a manufacturing method of the all solid battery 100a described in FIG. 2. FIG. 4 illustrates a flowchart of the manufacturing method of the all solid battery 100a.

(Making Process of Ceramic Material Powder) Powder of solid electrolyte for the solid electrolyte layer 30 is made. The solid electrolyte for the solid electrolyte layer 30 is $LiTa_2PO_8$ and the NASICON type solid electrolyte. Crystalline $LiTa_2PO_8$ is used as $LiTa_2PO_8$ powder. For example, it is possible to make the $LiTa_2PO_8$ powder by a solid phase synthesis method or the like from $Li_2CO_3$, $Ta_2O_5$, $P_2O_5$ and so on. Amorphous (vitrified) solid electrolyte is used as the NASICON type solid electrolyte. For example, it is possible to make the NASICON type solid electrolyte by a melt quenching method or the like from materials. The $LiTa_2PO_8$ powder and the NASICON type solid electrolyte powder are subjected to dry grinding. Thus, a particle diameter of the resulting power is adjusted to a desired one. For example, it is possible to adjust the particle diameter to the desired diameter with use of planetary ball mill using $ZrO_2$ ball of 5 mm ϕ.

The additive may include sintering assistant. The sintering assistant includes one or more of glass components such as Li—B—O-based compound, Li—Si—O-based compound, Li—C—O-based compound, Li—S—O-based compound and Li—P—O-based compound.

(Making Process of Green Sheet) The resulting powder is evenly dispersed into aqueous solvent or organic solvent together with a binding agent, a dispersing agent, a plasticizer and so on. The resulting powder is subjected to wet crushing. And solid electrolyte slurry having a desired particle diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is painted. Thus, a green sheet is obtained. The painting method is not limited. For example, a slot die method, a reverse coat method, a gravure coat method, a bar coat method, a doctor blade method or the like may be used. It is possible to measure the particle size distribution after the wet-crushing, by using a laser diffraction measurement device using a laser diffraction scattering method.

(Making Process of Paste for Internal Electrode) Next, paste for internal electrode is made in order to make the first electrode layer 11 and the second electrode layer 21. For example, a conductive auxiliary agent, an active material, a solid electrolyte material, a binder, a plasticizer and so on are evenly dispersed into water or organic solvent. Thus, paste for electrode layer is obtained. The above-mentioned solid electrolyte paste may be used as the solid electrolyte material. Pd, Ni, Cu, Fe, or alloy thereof, or a carbon material may be used as the conductive auxiliary agent. When the composition of the first electrode layer 11 is different from that of the second electrode layer 21, paste for internal electrode used for the first electrode layer 11 and another paste for internal electrode used for the second electrode layer 21 may be individually made.

(Making Process of Paste for Electric Collector) Next, paste for electric collector is made in order to make the first electric collector layer 12 and the second electric collector layer 22. It is possible to make the paste for electric collector, by evenly dispersing Pd powder, carbon black, board-shaped graphite carbon, a binder, dispersant, plasticizer and so on into water or organic solvent.

(Making Process of Paste for External Electrode) Next, paste for external electrode is made in order to make the first external electrode 40a and the second external electrode 40b. It is possible to make the paste for external electrode, by evenly dispersing conductive auxiliary agent, solid electrolyte, a binder, plasticizer and so on into water or organic solvent.

Figure 5A:
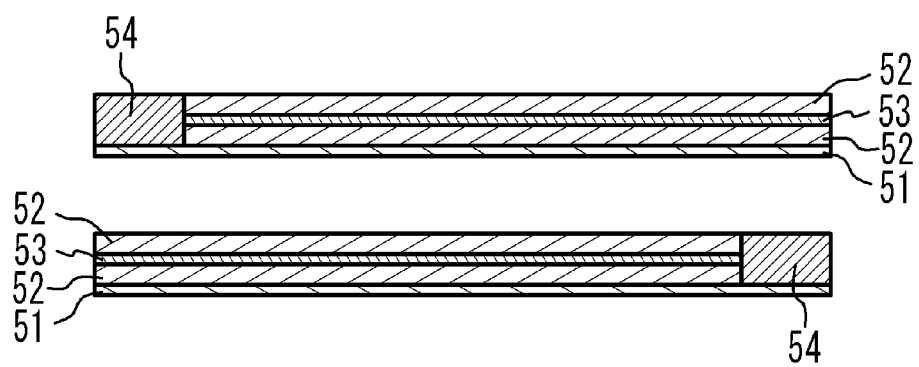
FIG. 5A and FIG. 5B illustrate a stacking process.
Figure 5B:
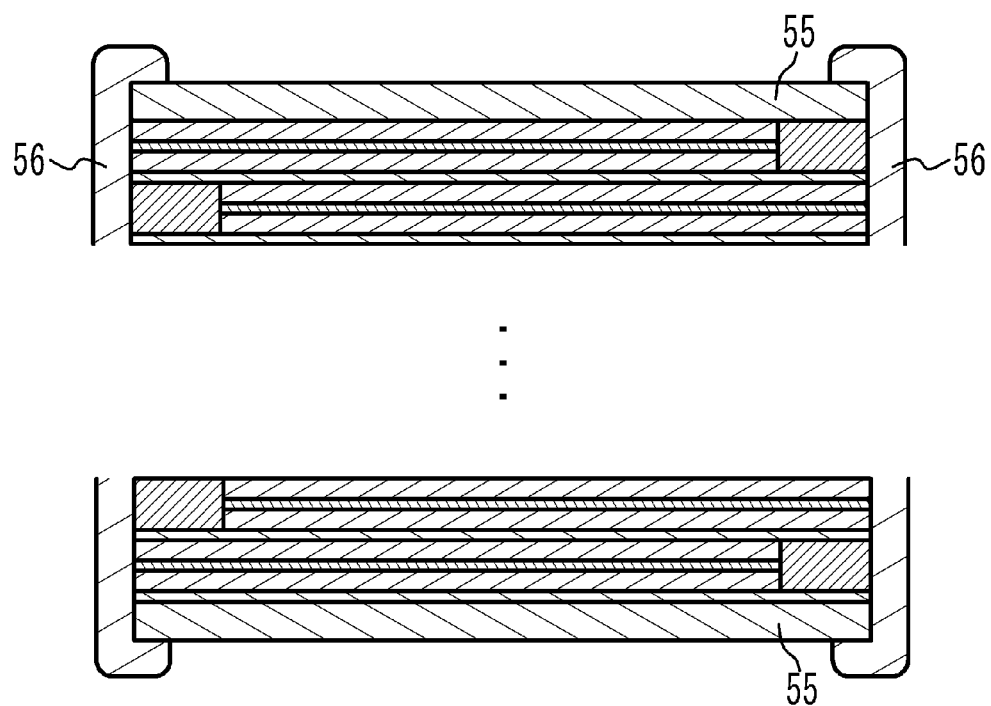

(Stacking Process) Paste 52 for internal electrode is printed on one face of a solid electrolyte green sheet 51 as illustrated in FIG. 5A. Paste 53 for electric collector is printed on the paste 52 for electrode layer. And, another paste 52 for internal electrode is printed on the paste 53 for electric collector. A reverse pattern 54 is printed on a part of the solid electrolyte green sheet 51 where neither the paste 52 for electrode layer nor the paste 53 for electric collector is printed. A material of the reverse pattern 54 may be the same as that of the solid electrolyte green sheet 51. The solid electrolyte green sheets 51 after printing are stacked so that each of the solid electrolyte green sheets 51 is alternately shifted to each other. Cover sheets 55 in which a plurality of solid electrolyte green sheets are stacked are crimped from an upper side and a lower side of the stacking direction. Thus, a multilayer structure is obtained. In this case, in the multilayer structure, a pair of the paste 52 for internal electrode and the paste 53 for electric collector are alternately exposed to the two end faces Next, as illustrated in FIG. 5B, the two end faces are coated with paste 56 for external electrode by dipping method or the like. After that, the paste 56 for external electrode is dried. Thus, a compact for forming the all solid battery 100a is obtained.

(Firing Process) Next, the multilayer structure is fired. By the firing process, the amorphous NASICON type solid electrolyte of the solid electrolyte green sheet is crystallized.

In the firing process, it is preferable that a maximum temperature is 400 degrees C. to 1000 degrees C. in oxidizing atmosphere or non-oxidizing atmosphere. It is more preferable that that maximum temperature is 500 degrees C. to 900 degrees C. In order to sufficiently remove the binder until the maximum temperature, a process for keeping a temperature lower than the maximum temperature in oxidizing atmosphere may be performed. It is preferable that the firing is performed in the lowest possible temperature, from a viewpoint of reduction of the process cost. After the firing, a re-oxidizing process may be performed. In this manner, the all solid battery 100 or the all solid battery 100a is manufactured.

In the manufacturing method of the all solid battery 100a of FIG. 2, the process of printing the paste 53 for electric collector is omitted in the process of FIG. 5A.

Figure 6:
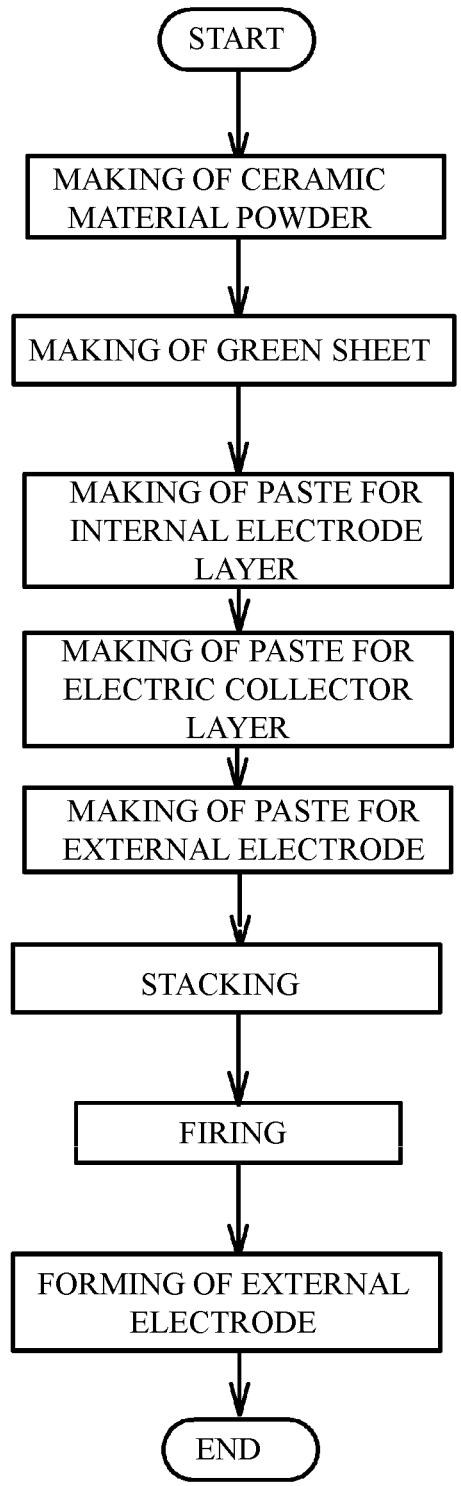
FIG. 6 illustrates another flowchart of a manufacturing method of an all solid battery.

The first external electrode 40a and the second external electrode 40b may be formed by firing after the firing process. FIG. 6 illustrates a flow of a manufacturing method of this case. For example, in the stacking process, the paste 56 for external electrode is not painted. The paste 56 for external electrode is painted on the two end faces of the multilayer chip 60 obtained by the firing process. And, the paste 56 for external electrode is fired. Thus, the first external electrode 40a and the second external electrode 40b can be formed.

In the embodiment, the solid electrolyte green sheet includes $LiTa_2PO_8$. Therefore, The solid electrolyte layer 30 formed by the firing process has high ionic conductivity. And favorable cell characteristic can be achieved. And it is possible to form the solid electrolyte layer 30 at a relatively low temperature because the solid electrolyte green sheet includes the amorphous NASICON type solid electrolyte. It is therefore possible to suppress the mutual diffusion reaction between the solid electrolyte layer 30 and the electrode active material.

When an average particle diameter of the $LiTa_2PO_8$ powder in the solid electrolyte green sheet is large, it may be difficult to reduce the thickness of the solid electrolyte green sheet and smooth the solid electrolyte green sheet. And so, it is preferable that the average particle diameter of the $LiTa_2PO_8$ powder in the solid electrolyte green sheet has an upper limit. On the other hand, when the average particle diameter of the $LiTa_2PO_8$ powder in the solid electrolyte green sheet is small, the mutual diffusion reaction between the solid electrolyte materials during the firing may easily occur. And so, it is preferable that the average particle diameter of the $LiTa_2PO_8$ powder in the solid electrolyte green sheet has a lower limit. In concrete, it is preferable that the average particle diameter of the $LiTa_2PO_8$ powder in the solid electrolyte green sheet is 0.1 μm or more and 10 μm or less. It is more preferable that the average particle diameter is 0.2 μm or more and 5 μm or less. It is still more preferable that the average particle diameter is 0.5 μm or more and 3 μm or less.

EXAMPLES

All solid batteries in accordance with the above-mentioned embodiment were made. And characteristic of the all solid batteries was measured.

(Example 1) Crystalline $LiTa_2PO_8$ was synthesized by a solid phase synthesizing method. In concrete, $Li_2CO_3$, $Ta_2O_5$ and $P_2O_5$ were mixed with a molar ratio of 1:2:1 and were subjected to a thermal treatment in normal atmosphere at 600 degrees C. After that, the resulting material was crushed and mixed. The resulting material was again subjected to a thermal treatment at 1050 degrees C. Thus, $LiTa_2PO_8$ was synthesized. It was confirmed that the synthesized powder is a single phase, by an XRD method.

Li—Al—Ge—$PO_4$-based glass precursor (hereinafter referred to as LAGP-g) was synthesized by a melt quenching method. $Li_2CO_3$, $Al_2O_3$, $GeO_2$ and $P_2O_5$ were mixed and converted into glass melt at 1400 degrees C. From the glass melt, glass was made by casting. The glass was crushed so that D50 of the glass was 2 μm by a dry ball mill. The molar ratio of the glass materials were $Li_2O:Al_2O_3:GeO_2:P_2O_5=0.73:0.27:1.4:1.5$.

$LiTa_2PO_8$ and LaGP-g were subjected to grinding and mixed so that a weight ratio of $LiTa_2PO_8$ and LAGP-g was 64:36. $LiTa_2PO_8$ and LaGP-g were pelletized by a uniaxial press machine so that a diameter Φ was 15 mm and a thickness was 0.5 mm. The pellet was sintered at a maximum temperature of 650 degrees C. LAGP-g was crystallized (hereinafter referred to as LAGP). The sintered substance was broken. The cross section was observed by a SEM and was subjected to an EDS element mapping. The area ratio of $LiTa_2PO_8$ and LAGP was 50:50.

(Example 2) The weight ratio of $LiTa_2PO_8$ and LAGP-g was 50:50. And $LiTa_2PO_8$ and LAGP-g were sintered at a temperature of 640 degrees C. Other conditions were the same as those of the example 1. The area ratio of $LiTa_2PO_8$ and LAGP was approximately 36:64.

(Example 3) The weight ratio of $LiTa_2PO_8$ and LAGP-g was 30:70. And $LiTa_2PO_8$ and LAGP-g were sintered at a temperature of 620 degrees C. Other conditions were the same as those of the example 1. The area ratio of $LiTa_2PO_8$ and LAGP was approximately 20:80.

(Example 4) The weight ratio of $LiTa_2PO_8$ and LAGP-g was 80.4:19.6. And $LiTa_2PO_8$ and LAGP-g were sintered at a temperature of 700 degrees C. Other conditions were the same as those of the example 1. The area ratio of $LiTa_2PO_8$ and LAGP was approximately 70:30.

(Example 5) The weight ratio of $LiTa_2PO_8$ and LAGP-g was 87.5:12.5. And $LiTa_2PO_8$ and LAGP-g were sintered at a temperature of 720 degrees C. Other conditions were the same as those of the example 1. The area ratio of LiTa2PO8 and LAGP was approximately 80:20.

(Example 6) LAZP (Li—Al—Zr—$PO_4$-based) glass was used as the glass material instead of LAGP-g. Other conditions were the same as those of the example 4. The area ratio of $LiTa_2PO_8$ and LAZP was approximately 60:40.

(Comparative Example 1) The weight ratio of $LiTa_2PO_8$ and LAGP-g was 16:84. And $LiTa_2PO_8$ and LAGP-g were sintered at a temperature of 610 degrees C. Other conditions were the same as those of the example 1. The area ratio of $LiTa_2PO_8$ and LAGP was approximately 10:90.

(Comparative Example 2) The weight ratio of $LiTa_2PO_8$ and LAGP-g was 94:6. And $LiTa_2PO_8$ and LAGP-g were sintered at a temperature of 770 degrees C. Other conditions were the same as those of the example 1. The area ratio of $LiTa_2PO_8$ and LAGP was approximately 90:10. When $LiTa_2PO_8$ and LAGP-g were sintered at a temperature lower than 770 degrees C., lacking of densifying by sintering was remarkable. When $LiTa_2PO_8$ and LAGP-g were sintered at a temperature higher than 770 degrees C., mutual diffusion reaction between materials was remarkable and an interface of the element mapping was not clear.

(Comparative example 3) Li—B—O-based glass was used as the glass material, instead of LAGP-g. The weight ratio of $LiTa_2PO_8$ and Li—B—O-based glass was 75:25. And $LiTa_2PO_8$ and Li—B—O-based glass were sintered at a temperature of 700 degrees C. Other conditions were the same as those of the example 1. The area ratio of LiTa$_2$PO$_8$ and Li—B—O-based glass was approximately 50:50.

(Analysis) Ionic conductivity was measured with respect to each of the examples 1 to 6 and the comparative examples 1 to 3. Table 1 shows the results. The ionic conductivity of the example 1 was 1.8×10$^{-4}$ S/cm. The ionic conductivity of the example 2 was 1.5×10$^{-4}$ S/cm. The ionic conductivity of the example 3 was 1.2×10$^{-4}$ S/cm. The ionic conductivity of the example 4 was 1.6×10$^{-4}$ S/cm. The ionic conductivity of the example 5 was 1.4×10$^{-4}$ S/cm. The ionic conductivity of the example 6 was 1.1×10$^{-4}$ S/cm. The ionic conductivity of the comparative example 1 was 7.0×10$^{-5}$ S/cm. The ionic conductivity of the comparative example 2 was 5.2×10$^{-6}$ S/cm. The ionic conductivity of the comparative example 3 was 8.3×10$^{-5}$ S/cm. When the ionic conductivity was 10$^{-4}$ S/cm or more, the sample was determined as good "◯". When the ionic conductivity was less than 10$^{-4}$ S/cm, the sample was determined as bad "X".

The used amount of Ge was determined as bad "X" in the comparative example 1 in which the area ratio of LAGP was 90% or more. The used amount of Ge was determined as good "◯" in the examples 1 to 6 in which the area ratio of LAGP was less than 90%.

Although the embodiments of the present invention have been described in detail, it is to be understood that the various change, substitutions, and alterations could be made hereto without departing from the spirit and scope of the invention.

What is claimed is:

1. Solid electrolyte comprising:
   a first solid electrolyte that is a phosphate salt including Li and Ta; and
   a second solid electrolyte that is NASICON solid electrolyte,

TABLE 1

| | WEIGHT RATIO BEFORE FIRING | | VOLUME RATIO AFTER FIRING | | SINTERING TEMPERATURE | | IONIC CONDUCTIVITY | | Ge | |
|---|---|---|---|---|---|---|---|---|---|---|
| | LiTa$_2$PO$_8$ | LAGP-g | LiTa$_2$PO$_8$ | LAGP | °C. | DECISION | S/cm | DECISION | total | amount |
| EXAMPLE 1 | 64 | 36 | 50 | 50 | 650 | ◯ | 1.8 × 10$^{-4}$ | ◯ | ◯ | ◯ |
| EXAMPLE 2 | 50 | 50 | 36 | 64 | 640 | ◯ | 1.5 × 10$^{-4}$ | ◯ | ◯ | ◯ |
| EXAMPLE 3 | 30 | 70 | 20 | 80 | 620 | ◯ | 1.2 × 10$^{-4}$ | ◯ | ◯ | Δ |
| EXAMPLE 4 | 80.4 | 19.6 | 70 | 30 | 700 | ◯ | 1.6 × 10$^{-4}$ | ◯ | ◯ | ◯ |
| EXAMPLE 5 | 87.5 | 12.5 | 80 | 20 | 720 | Δ | 1.4 × 10$^{-4}$ | ◯ | ◯ | ◯ |
| EXAMPLE 6 | 80.4 | LAZP 19.6 | 60 | LAZP 40 | 700 | ◯ | 1.1 × 10$^{-4}$ | ◯ | ◯ | ◯ |
| COMPARATIVE EXAMPLE 1 | 16 | 84 | 10 | 90 | 610 | ◯ | 7.0 × 10$^{-5}$ | x | x | x |
| COMPARATIVE EXAMPLE 2 | 94 | 6 | 90 | 10 | 770 | x | 5.2 × 10$^{-6}$ | x | x | ◯ |
| COMPARATIVE EXAMPLE 3 | 75 | LBO 25 | 50 | LBO 50 | 700 | ◯ | 8.3 × 10$^{-5}$ | x | x | ◯ |

The ionic conductivity was 10$^{-4}$ S/cm or more in the examples 1 to 6. It is thought that this was because the area ratio of LiTa$_2$PO$_8$ having high ionic conductivity was more than 10%. On the other hand, the ionic conductivity was less than 10$^{-4}$ S/cm in the comparative examples 1 and 2. It is thought that this was because the area ratio of LiTa$_2$PO$_8$ was 10% or less. The ionic conductivity of the comparative example 3 was less than 10$^{-4}$ S/cm. It is thought that this was because the ionic conductivity of the Li—B—O-based glass was low.

Next, the sintering temperature was 720 degrees C. or less in the examples 1 to 6. Therefore, the sintering temperature of the examples 1 to 6 was determined as good "◯". It is thought that this was because the area ratio of the NASICON type solid electrolyte was more than 10% and the sintering temperature was reduced. On the other hand, the sintering temperature was 770 degrees C. in the comparative example 2. Therefore, the sintering temperature of the comparative example 2 was determined as bad "X". It is thought that this was because the area ratio of the NASICON type solid electrolyte was 10%, and the sintering temperature was not sufficiently reduced.

When both of the ionic conductivity and the sintering temperature were determined as good "◯", the sample was totally determined as good "◯". When at least one of the ionic conductivity and the sintering temperature was determined as bad "X", the sample was totally determined as bad "X". The examples 1 to 6 were totally determined as good "◯". The comparative examples 1 to 3 were totally determined as bad "X".

wherein, in a cross section of the solid electrolyte, an area ratio of the first solid electrolyte is more than 10% and an area ratio of the second solid electrolyte is more than 10%.

2. The solid electrolyte as claimed in claim 1,
wherein the first solid electrolyte is expressed by composition formula of Li$_{1+x+y}$A$_x$B$_y$C$_z$Ta$_{2-x-y-z}$PO$_8$,
wherein "A" is at least one of trivalent metal elements Al, Sc, Y and La,
wherein "B" is at least one of tetravalent metal elements Ge, Hf, Sn and Zr,
wherein "C" is at least one of pentavalent metal elements Nb, As, Sb and Bi, and
wherein a relationship "0≤x+y+z≤0.5" is satisfied.

3. The solid electrolyte as claimed in claim 1, wherein the second solid electrolyte includes at least Li, Ge and P.

4. The solid electrolyte as claimed in claim 1, wherein the second solid electrolyte includes Li, Zr and P.

5. The solid electrolyte as claimed in claim 1, wherein an average crystal grain diameter of the first solid electrolyte is 0.1 μm or more and 10 μm or less.

6. The solid electrolyte as claimed in claim 1, wherein the second solid electrolyte before firing is amorphous.

7. An all solid battery comprising:
   a solid electrolyte layer including solid electrolyte as claimed in claim 1; and
   a plurality of internal electrodes that include an electrode active material,
   wherein the solid electrolyte layer and each of the plurality of internal electrodes are alternately stacked.

8. A manufacturing method of an all solid battery comprising:
   preparing a multilayer structure including a green sheet including phosphate salt powder including Li and Ta and amorphous solid electrolyte powder of NASICON type, a first electrode layer paste formed on a first main face of the green sheet, and a second electrode layer paste formed on a second main face of the green sheet; and
   firing the multilayer structure.

* * * * *